United States Patent [19]
Hattori

[11] Patent Number: 4,636,866
[45] Date of Patent: Jan. 13, 1987

[54] PERSONAL LIQUID CRYSTAL IMAGE DISPLAY
[75] Inventor: Noboru Hattori, Shiojiri, Japan
[73] Assignee: Seiko Epson K.K., Japan
[21] Appl. No.: 564,521
[22] Filed: Dec. 22, 1983
[30] Foreign Application Priority Data Dec. 24, 1982 [JP] Japan .................................. 57-232547

[51] Int. Cl.4 .................. H04N 5/74; H04N 13/04
[52] U.S. Cl. ...................................... 358/236; 358/88; 358/250; 340/705
[58] Field of Search ................ 358/236, 237, 83, 103, 358/104, 105, 230, 254, 88, 60, 89, 231, 91, 92, 250, 225; 340/784, 705

[56] References Cited
U.S. PATENT DOCUMENTS

| 3,738,733 | 6/1973 | Pettit | 358/250 |
| 4,021,846 | 5/1977 | Roese | 358/92 |
| 4,310,849 | 1/1982 | Glass | 358/250 |
| 4,395,731 | 6/1983 | Schoolman | 358/108 |
| 4,403,216 | 9/1983 | Yokoi | 340/705 |

FOREIGN PATENT DOCUMENTS 1103961 12/1959 Fed. Rep. of Germany ...... 358/237

Primary Examiner—Tommy P. Chin
Attorney, Agent, or Firm—Blum Kaplan Friedman Silberman & Beran

[57] ABSTRACT

A personal liquid crystal image display includes a housing to be worn on a user's head, a light-transmission-type liquid crystal display panel for displaying video signals and a lens positioned between the display panel and a user's eye to enlarge the image. The housing may include earphones. The display and earphones are coupled to a tuner for receiving signal and driving the display and earphones. A portion of the drive circuit for driving the display may be disposed in the housing.

16 Claims, 8 Drawing Figures

PERSONAL LIQUID CRYSTAL IMAGE DISPLAY

BACKGROUND OF THE INVENTION

This invention relates to a compact-sized personal liquid crystal image display including a lens and a liquid crystal display panel, for use in displaying images of high clarity and high contrast.

Recently, a variety of image displays have been proposed, for use in such devices such as pocket television receivers and wrist watch type television receivers, in which a liquid crystal display panel is employed as the image display device. These proposed image display devices generally employ light-reflection-type liquid crystal display panels for their viewing screen. In practice, this is disadvantageous, since light-reflection-type liquid crystal display units have poor contrast ability, suffer from low image quality, and are incapable of color display. Additionally, these small sized displays, for personal use, are limited to small display screens. If the display screens are manufactured in a larger size, they then become costly to construct. Accordingly, it is desirable to provide a personal liquid crystal image display which overcomes the aforementioned limitations.

SUMMARY OF THE INVENTION

Generally speaking, in accordance with the invention, a personal liquid crystal image display is provided. The display includes a video output unit for separating composite video signals from a broadcast or other source into individual video and audio signals, a light-transmission-type liquid crystal display panel having a driver circuit for displaying the video signals from the output unit, a lens system including at least one lens interposed between the light-transmission type liquid crystal display panel and the user's eye and a holder for holding the lens member and the light transmission liquid crystal display panel in a relational and positional alignment with the user's eyes.

Accordingly, it is an object of the invention to provide an improved personal liquid crystal image display.

A further object of the invention is to provide a light-transmission-liquid crystal display panel and lens positioned between the display panel and the users eyes, which has good contrast, is capable of color display, and allows enlarged images to be viewed through the lens means.

Another object of the present invention is to provide a personal liquid crystal image display with a light-transmission-type liquid crystal display panel and a lens means held together by a holder means, which is compact in size and permits good viewability.

Still another object of the present invention is to provide a liquid crystal image display having an audio signal output device, such as a headphone, integral within a holder means for a liquid crystal display panel, to enable a user to access an audio and video signal in an individual manner without disturbing others.

Still other objects and advantages of the invention will in part be obvious and will in part be apparent from the specification.

The invention accordingly comprises the features of construction, combinations of elements and arrangements of parts which will be exemplified in construction hereafter set forth, and the scope of the invention will be indicated in the claims.

BRIEF DESCRIPTION OF THE DRAWINGS

For a fuller understanding of the invention, reference is had to the following descriptions taken in connection with the accompanying drawings, in which.

DESCRIPTION OF THE PREFERRED EMBODIMENTS

Figure 1:
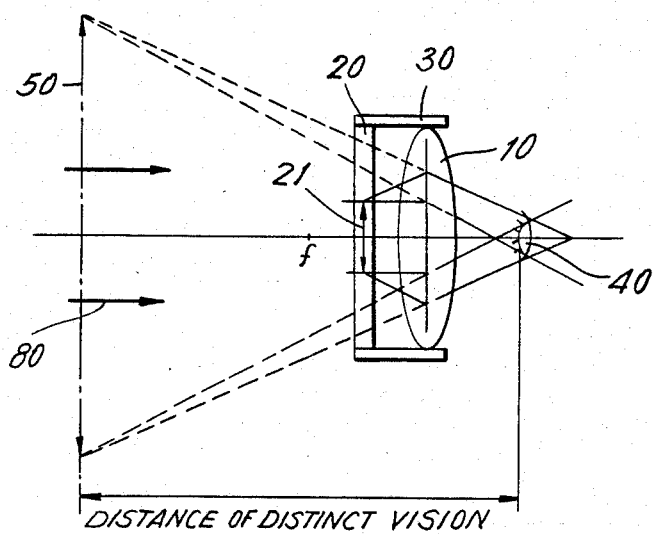
FIG. 1 is a block diagram showing the optical arrangement of the device in accordance with the invention.

Referring now to FIG. 1, a lens 10, which may include one or more lenses, has a focal length f. For the purposes of this application, however, lens 10 employs a single convex lens as illustrated in the preferred embodiments. A light-transmission-type liquid crystal display panel 20 displays thereon an image 21 in response to a drive signal from an output unit applied thereto. Liquid crystal display panel 20 is held by a holding member 30 so as to be positioned within the focal length of convex lens 10. Lens 10 is also held by holding member 30. In an alternate embodiment, lens 10 may also be held by a frame of a pair of glasses worn by the user (not shown). When display panel 20 and lens 10 are worn by a user, each eye of the user is positioned at a normal distance of 1 to 3 centimeters from lens 10 on the side of lens 10 away from display panel 20.

Operation of the construction as shown in FIG. 1 is as follows:

Liquid crystal display panel 20 is located within the focal length of lens 10. Image 21 displayed on display panel 20 is illuminated by rays of natural light 80 or light emitted from a lamp (not shown). Image 21 is viewed through lens 10 by eye 40 of the user as an enlarged virtual image 50. The position of eye 40, the focal length f of lens 10 and the postion of liquid crystal display panel 20 are selected so that virtual image 50 is formed at a point of focus, which is known as the "shortest distance of distinct vision". This point is the closest that an image can be to a user's eye 40 while still remaining in sharp focus. This point falls within the range of between about 25 to 40 centimeters for a young adult, more than 40 centimeters for an older adult and generally less than 25 centimeters for a child. An image focused within this positional relationship allows the user to see the image clearly, without fatigue, for extended periods of time.

Displayed image 21 on liquid crystal display device 20 viewed with transmitted natural light 80 can be seen with very high contrast. When image 21 is displayed in a color dot matrix or color line matrix display, it can be seen as a color display.

A personal liquid crystal image display 100 according to a first embodiment of the invention will now be described with reference to FIG. 2. Identical reference numerals in FIG. 2 denote identical parts in FIG. 1. Personal liquid crystal image display 100 includes one light-transmission type liquid crystal display panel 20 and one convex lens 10. Rays of natural light 80 fall on a light collecting window 81 formed in holding member 30 and pass through liquid crystal display panel 20 and lens 10. The transmitted light is then divided by a prism 60 mounted behind lens 10 into two alternate light ray paths to a pair of reflecting mirrors 61 which reflect the image into the eyes 40 of the user. Light collecting window 81, display panel 20, lens 10, prism 60 and reflecting mirrors 61 are supported by holding member 30 which is in the shape of a hood or goggles.

Holding member 30 is formed to accommodate two circuit panels 62 which may be integrated circuits for driving liquid crystal display panel 20. Circuit panels 62 have external connection lines (not shown) for connection to a terminal 63 to allow external signals to be brought into holding member 30. A pair of audio headphones 64 may be adjustably attached to holding member 30 for positioning in close contact with ears 70 of the user.

Figure 2:
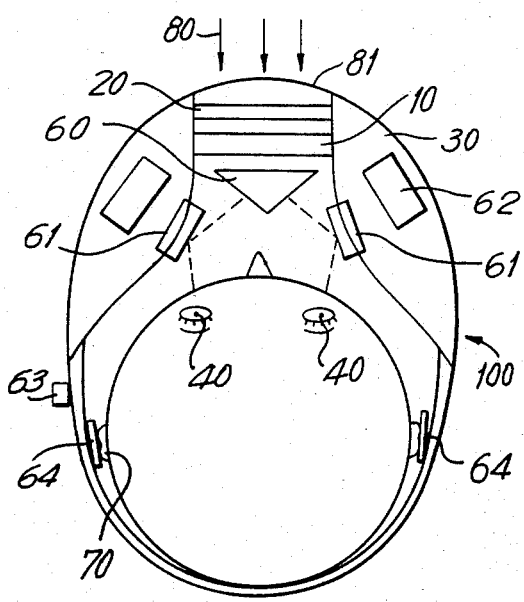
FIG. 2 is a partial cross-sectional view of a personal liquid crystal image display according to the invention.

As can be seen in FIG. 2, liquid crystal display panel 20, lens 10, and prism 60 permit the user to see the displayed images with both eyes 40 at the same time with high contrast and at an enlarged size.

As shown in FIG. 2 holding member 30 is shaped as an enlarged hood, which houses liquid crystal display panel 20 and headphones 64. According to this embodiment, personal liquid crystal display 100 can reproduce both audio and video signals originating as television broadcasts or computer signals for total personal use without disturbing others.

Figure 3:
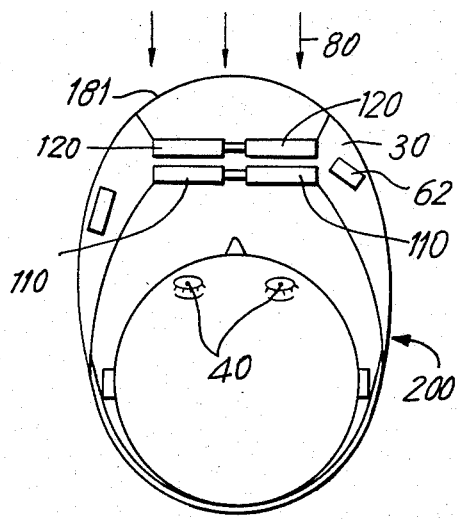
FIG. 3 is a partial cross-sectional view of a personal liquid crystal image display according to another embodiment of the invention.

FIG. 3 illustrates another embodiment of the present invention. Identical parts in FIG. 3 are designated by identical reference numerals in FIGS. 1 and 2. As illustrated in FIG. 3, a personal liquid crystal image display 200 in accordance with the invention includes two light-transmission-type liquid crystal display panels 120 and two lenses 110 aligned respectively therein. Using this arrangement, both liquid crystal display panels 120 can display the same image at the same time. Alternately, the two display panels can show different images, thereby allowing the user to view images in three dimensions.

Images displayed on liquid crystal display panels 120 are illuminated from behind for high contrast by natural rays of light 80 coming through a wide light collecting window 181. Lenses 110 form an enlarged virtual image of the displayed image.

This arrangement allows for the production of bright images of a very high contrast. This system is less fatiguing to the user because of natural light rays 80 introduced from behind through light collecting window 181 through the light-transmission-type liquid crystal display panel 20.

Figure 4:
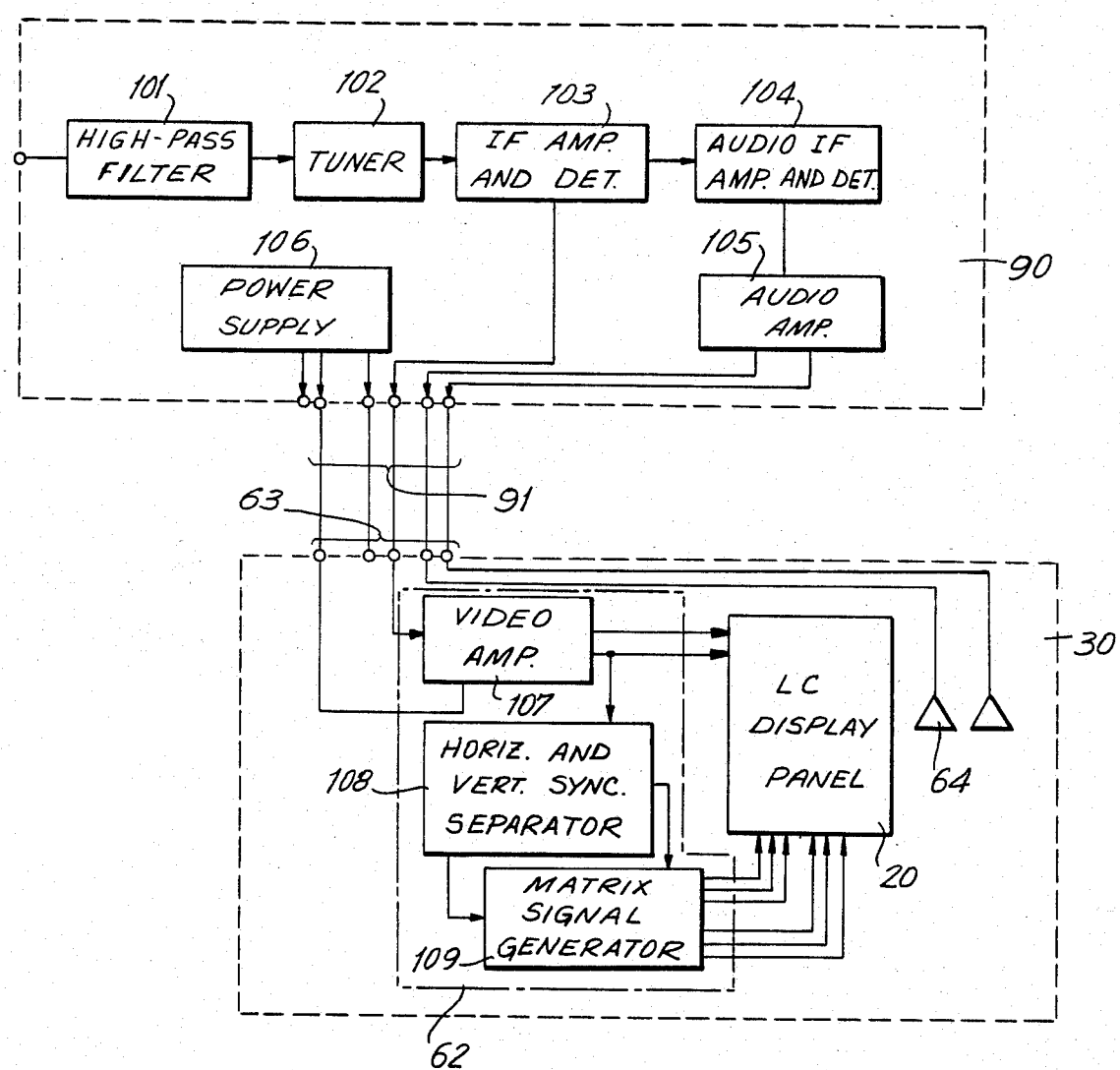
FIG. 4 is a block diagram of a television signal processing circuit for use in the personal liquid crystal image display of the invention.

Referring now to FIG. 4, a signal processing system for use with a personal liquid crystal display television receiver constructed according to the invention is shown. The signal processing system includes a main receiver body 90 (shown in FIG. 5) including a signal processing circuit for generating video and audio signals and a power supply 106 unit including a D.C. to D.C. converter and a battery.

The signal processinng circuit includes a high-pass filter 101 which receives input signals, such as a broadcast wave signal from an external antenna. Filtered signals are applied to a tuner 102 which tunes the signals to be applied to a video intermediate frequency amplifier and video detector 103 coupled to an external connection and an audio intermediate frequency amplifier and audio detector 104. The output from audio IF amplifier and audio detector 104 is applied to an audio amplifier 105.

The video and audio signals and the display drive voltage are supplied through cables 91 through external connection terminals 63 supported on holding member 30. A circuit panel 62 for receiving the video signals is disposed within holding member 30. Circuit panel 62 in holding member 30 includes a video amplifier 107 which receives video output signals from IF amplifier and detector 103, and applies signals to a horizontal and vertical synchronizing signal separator circuit 108 and a matrix signal generator circuit 109 for generating driving signals for driving liquid crystal display panel 20. Audio signals from audio amplifier 105 are fed to headphones 64 mounted on holding member 30.

Figure 5:
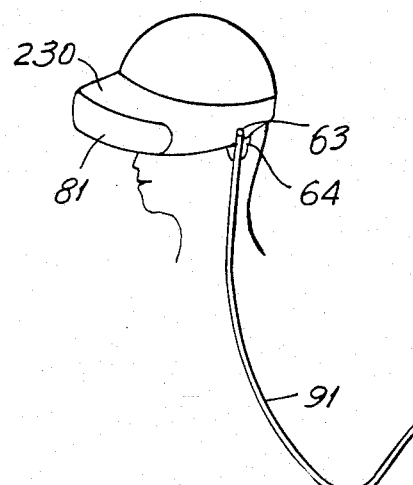
FIG. 5 is a perspective view of a personal liquid crystal image display system, while it is in use, according to one embodiment of the invention.

Referring now to FIG. 5, the manner in which a personal liquid crystal image display system is used as a television receiver will now be described.

A holding member 230 equipped with headphones 64 is worn on the user's head. A television receiver 90 includes a power supply and a volume adjustment and power switch knob 94 and a channel selection switch 93. A display of the type illustrated in FIG. 1 or 2 is turned on by switch 94 and a channel is selected by turning knob 93 to the desired channel. A cable 91 connects receiver 90 to holding member 30 and serves as an antenna to pick up the television broadcast signals. Receiver 90 generates video signals within the signal processing circuit described above in connection with FIG. 4 which are displayed as images on the liquid crystal and audio signals which are reproduced as sounds by headphones 64. For listening to a stereo program, a stereo mono changeover switch 92 is provided which may be actuated to select a stereo reproducing mode.

Figure 6A:
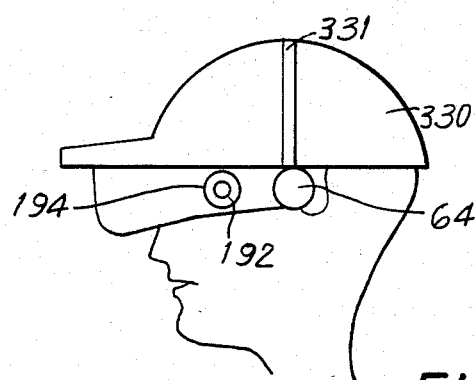
FIGS. 6a and 6b are side elevational and top plan views of a personal liquid crystal display system, worn by a user, according to another embodiment of the invention.
Figure 6B:
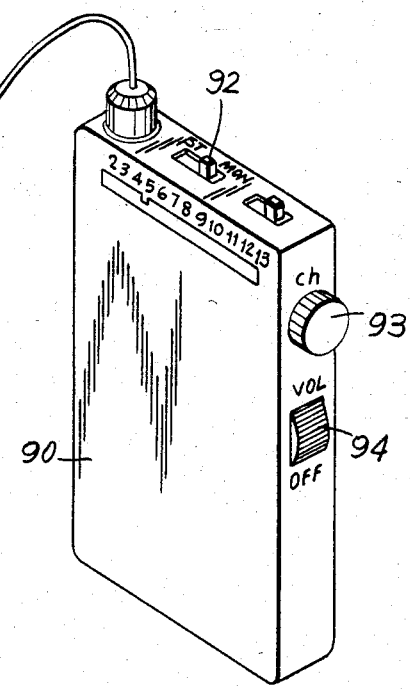
Figure 6B:
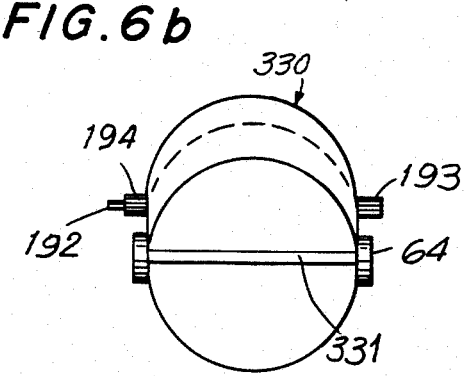

FIGS. 6a and 6b illustrate a personal liquid crystal image display system according to another embodiment of the present invention. A television receiver (not shown) housing the power supply and the signal processing circuit is incorporated into a holding member 330 in the shape of a cap with an antenna 331 attached to the outer surface of the cap. The other structural details are the same as those shown in FIG. 5.

In use, the cap-shaped holding member 30 is placed on the user's head. A power supply and volume adjustment switch knob 194 is provided on one side of holding member 330 and is turned to switch on the power supply. A channel selector knob 193 is provided on the other side of holding member 330 and is turned to select a desired channel. Broadcast wave signals are picked up by antenna 231 and images and sounds are reproduced in the liquid crystal display panel and in headphones 64 in holding member 330 in the same manner as described in connection with FIGS. 4 and 5.

This all-in-one construction illustrated in FIGS. 6(a) and (b) is well suited for use as a personal television receiver by passengers in cars or other vehicles during travel or other outdoor activities. As a further modification, the lens member may be formed of a plastic material in order to provide a display which is more lightweight as a whole.

Figure 7:
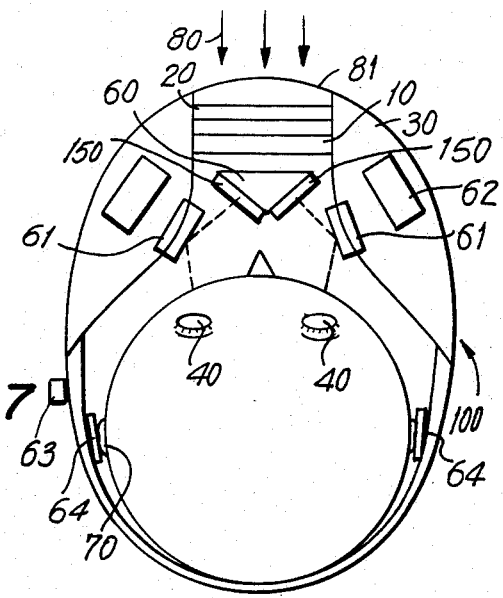
FIG. 7 is a partial cross-sectional view of a personal liquid crystal image display according to another embodiment of the invention.

In yet another embodiment of the invention, the liquid crystal display panels may display different images for use in providing a three-dimensional image display, or for displaying images on different channels, respectively. Additionally, one of the light transmissive liquid crystal display panels and the associated lens may be removed, or one of the liquid crystal display panels may remain de-energized to permit the user to look through the inactivated display panel. Alternatively, both of the liquid crystal display panels may be switchably deactivatable by the user, to see ahead in the event of an unexpected occurrence. Further, in another embodiment of the invention as shown in FIG. 7, shutters of liquid crystal display 150 are disposed adjacent to the prism 60. When right and left images are alternately displayed on the liquid crystal display panel 20 and the shutters of liquid crystal display 50 shut and open in synchronism with right and left images respectively, three-dimensional image display is achieved with one liquid crystal display panel 20.

Any other type shutter is available instead of shutter of liquid crystal display and the shutters can be placed in any position between the prism and user's eye.

In a construction made in accordance with the present invention, the light-transmission-type liquid crystal display panel is capable of displaying bright images of high contrast, with the aid of natural light which is transmitted through the panel, and can also easily be arranged to display color images. Since the lens or lenses are placed between the display panel and the user's eye to form virtual images at a distance of at least 25 centimeters or more of "distinct vision", the image display of the invention is less fatiguing to the user's eye. The lens also enables the user to see enlarged images that are magnified several times the size of the actual display images.

The liquid crystal display panel and the headphones are provided in the holding member so that the entire image display is inexpensive to construct, and can be relied on as a display and as a television receiver for exclusive and personal use, or as a display for a computer or other data system.

It will thus be seen that the objects set forth above, and those made apparent from the preceding descriptions, are effectively attained and since certain changes may be made in the above construction without departing from the spirit and scope of the invention, it is intended that all matter contained in the above description or shown in the encompanying drawings, shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A liquid crystal image display device to be worn on a user's head, comprising:
holding means for holding elements of the display adapted to surround the eyes of the user and be worn on the user's head and formed with at least one opening to permit incident light to enter the holding means in the region in front of the user's eyes;
at least one light-transmission-type liquid crystal display panel disposed in the holding member along the line of sight of said at least one opening for displaying an image;
lens means disposed in the holding means along the line of sight between said liquid crystal display panel and the user's eyes for enlarging the size of said image displayed on the display panel; and
signal means coupled to the display panel for generating liquid crystal drive signals for driving said liquid crystal display panel, said display panel being positioned a distance from the lens means which is within the focal length of said lens means.

2. The ersonal liquid crystal image display, as claimed in claim 1, wherein the at least one display panel includes two light-transmission-type liquid crystal display panels disposed side-by-side in the opening of the holding means, each display panel disposed along the line of sight of and associated with one of the user's eyes, said lens means including an associated lens means for each display panel disposed in the holding means between the associated panel and eye.

3. The personal liquid crystal image display, as claimed in claim 1, wherein the opening on said holding means further comprises a light collecting window on the side of said display panel opposite from said lens means for admitting light to be transmitted through said display panel.

4. The personal liquid crystal image display as claimed in claim 1, wherein the signal means includes driver circuit means for driving said display panel.

5. The personal liquid crystal image display, as claimed in claim 4, wherein said driver circuit means includes a circuit which is at least partly mounted in said holding means.

6. The personal liquid crystal image display as claimed in claim 1, further including a prism and a reflecting mirror mounted in said holding means between said lens means and the user's eye for directing light transmitted through said display to the user's eye.

7. The personal liquid crystal image display as claimed in claim 1, wherein said lens means is a plastic lens.

8. The personal liquid crystal image display of claim 1, wherein said signal means includes at least video signal receiving means.

9. The personal liquid crystal image display of claim 1, wherein the signal means includes video and audio signal receiving means.

10. The personal liquid crystal image display of claim 9, wherein the holding means further includes earphones disposed adjacent to the user's ears to receive signals generated by said video and audio signal receiving means.

11. The personal liquid crystal image display as claimed in claim 1, wherein at least a portion of said signal means is disposed in said holding means.

12. A personal liquid crystal image display to be worn on a user's head, comprising:
holding means for holding elements of the display device adapted to surround the eyes of the user and to be worn on the user's head and formed with at least one opening to permit incident light to enter the holding means in the region in front of the user's eyes;
output circuit means for generating video and audio signals;

at least one light-transmission-type liquid crystal display panel disposed in the holding member along the line of sight of the opening and coupled to the output circuit means to receive the video signals, said display panel displaying an image;

lens means disposed along the line of sight between said liquid crystal display panel and the user's eyes, said liquid crystal display panel being located within the focal length of said lens means; and at least one earphone for producing sound in response to the audio signals generated by said output circuit means.

13. A personal liquid crystal image display to be worn on the user's head, comprising:

holding means for holding elements of the display device adapted to surround the eyes of the user and to be worn on the user's head and formed with at least one opening to permit incident light to enter the holding member in the region in front of the user's eyes;

at least one light-transmission-type liquid crystal display panel disposed in the opening in the holding member, said display panel displaying an image;

television tuner receiving means coupled to said holding means and said display panel, for receiving video and audio television signals, said video television signals being adapted for driving the liquid crystal display panel; and lens means disposed along the line of sight between said liquid crystal display panel and the user's eyes, said liquid crystal display means being located within the focal length of said lens means.

14. The personal liquid crystal image display of claim 13, wherein the holding means further includes earphones disposed adjacent to the user's ears to receive signals generated by said video and audio signal receiving means.

15. The personal liquid crystal image display of claim 13, wherein the television tuner receiving means is separate from the holding means.

16. A liquid crystal image display device to be worn on a user's head, comprising:

holding means for holding elements of the display device adapted to surround the eyes of the user and be worn on the user's head and formed with at least one opening to permit incident light to enter the holding means in the region in front of the user's eyes;

at least one light transmission type liquid crystal display panel disposed in the holding means along the line of sight of the opening for displaying an image;

lens means disposed in the holding means along the line of sight between said liquid crystal display panel and the user's eyes for enlarging the size of the image displayed on the display panel, said display panel being positioned a distance from said lens means which is within the focal length of said lens;

signal means coupled to the display panel for generating liquid crystal drive signals for driving said liquid crystal display panel including right and left images of a three-dimensional display;

prism means and reflecting means mounted in said holding means between said lens means and the user's eyes for directing light transmitted through said display panel to the user's eyes; and shutter means disposed proximate to said prism means for selectively gating the images transmitted to the user's left and right eyes, synchronized with the right and left images, so that when right and left images are alternately displayed on said liquid crystal display panel a three-dimensional image display is achieved with the use of one liquid crystal display panel.

* * * * *